(12) United States Patent
Lou et al.

(10) Patent No.: US 7,444,664 B2
(45) Date of Patent: Oct. 28, 2008

(54) MULTI-VIEW VIDEO FORMAT

(75) Inventors: Jianguang Lou, Beijing (CN); Hua Cai, Zhejiang Province (CN); Jiang Li, Beijing (CN)

(73) Assignee: Microsoft Corp., Redmond, WA (US)

( * ) Notice: Subject to any disclaimer, the term of this patent is extended or adjusted under 35 U.S.C. 154(b) by 898 days.

(21) Appl. No.: 10/923,106

(22) Filed: Aug. 19, 2004

(65) Prior Publication Data
US 2006/0026646 A1   Feb. 2, 2006

Related U.S. Application Data

(62) Division of application No. 10/901,477, filed on Jul. 27, 2004.

(51) Int. Cl.
*H04N 7/173* (2006.01)

(52) U.S. Cl. .................. 725/105; 725/86; 725/38; 386/46; 386/70; 348/211.3; 348/231.2; 348/231.4

(58) Field of Classification Search ............. None
See application file for complete search history.

(56) References Cited

U.S. PATENT DOCUMENTS

| | | | |
|---|---|---|---|
| 5,642,346 A | 6/1997 | Taira et al. | |
| 6,118,927 A | 9/2000 | Kikuchi et al. | |
| 6,144,797 A * | 11/2000 | MacCormack et al. | 386/46 |
| 6,678,008 B1 * | 1/2004 | Winter | 348/565 |
| 2002/0025135 A1 | 2/2002 | Hideo et al. | |
| 2003/0095790 A1 * | 5/2003 | Joshi | 386/69 |
| 2003/0202691 A1 | 10/2003 | Beardsley | |
| 2003/0235403 A1 | 12/2003 | Soo et al. | |
| 2004/0165862 A1 * | 8/2004 | Jung et al. | 386/69 |
| 2004/0213552 A1 * | 10/2004 | Kato | 386/69 |

FOREIGN PATENT DOCUMENTS

WO   WO2004/055809   7/2004

OTHER PUBLICATIONS

Faugeras, O., Q.-T. Luong, Geometry of Multiple Images, The MIT Press, Cambridge, Massachusetts, Apr. 4, 2005. pp. 284-285.
Xu, G., J. Terai, H.-Y. Shum, A linear algorithm for camera self-calibration, motion and structure recovery for multi-planar scenes from two perspective images, *Proceedings IEEE Conf. on Comp. Vision and Pattern Recognition*, 2000, vol. 2, pp. 474-479.
European Search Report, Application No. EP05106799.9, completed May 26, 2006, received Jun. 6, 2006.

* cited by examiner

*Primary Examiner*—Ngoc-Yen Vu
*Assistant Examiner*—Cynthia Calderon
(74) *Attorney, Agent, or Firm*—Lyon & Harr, LLP; Katrina A. Lyon

(57) ABSTRACT

Interactive multi-view video presents new types of video capture systems, video formats, video compression algorithms, and services. Many video cameras are allocated to capture an event from various related locations and directions. The captured videos and any associated audio streams are captured in a video beam format which allows for the efficient and expedient search of the vast amount of data in real-time and allows the data to be stored for off-line access.

18 Claims, 16 Drawing Sheets

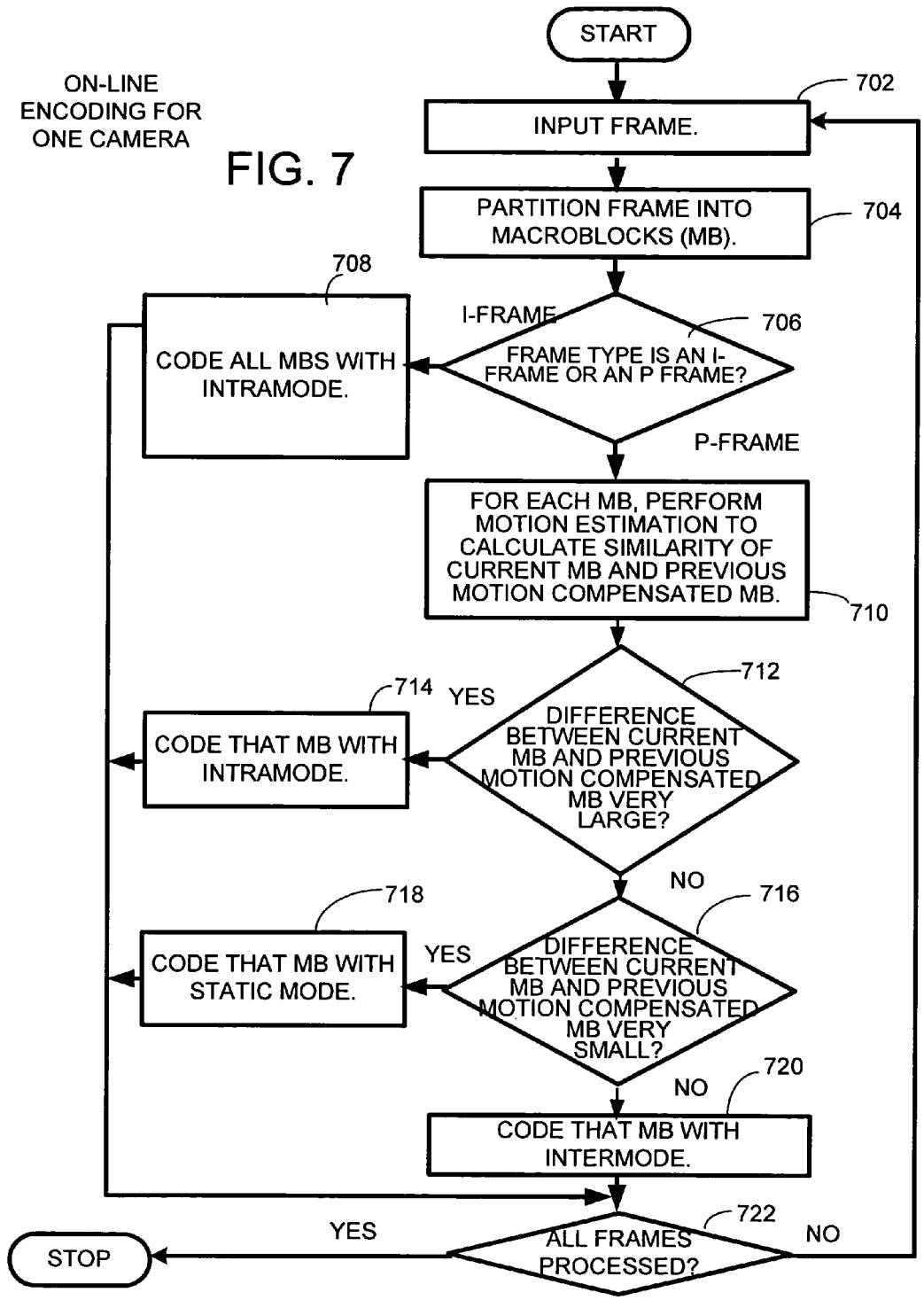

ON-LINE
CODING
ARCHITECTURE

MC: motion compensation
T: transformation (e.g., discrete cosine transform (DCT))
Q: quantization
T-1: inverse transformation
Q-1: inverse quantization

MULTI-VIEW VIDEO FORMAT

This is a divisional application of application Ser. No. 10/901,477, filed Jul. 27, 2004.

BACKGROUND

1. Technical Field

This invention is directed toward a system and method for interactive multi-view video which includes a new type of video format.

2. Background Art

The current popularly used video form is so-called single-view video. It consists of one video clip that is captured from one video camera or multiple video clips that are concatenated using sequential time periods. For any time instance, there is only one view of an event. This kind of video form is widely used in video streaming, broadcasting and communication in televisions (TVs), personal computers (PCs) and other devices.

When reviewing conventional multimedia services (like traditional TV, video-on-demand, video streaming, digital video disc (DVD), and so on), there exist several limitations. For example, in conventional multimedia services, there is only one video stream for an event at any instance in time. Additionally, in conventional multimedia services, the viewing direction at any time instance is selected by program editors. Users are in a passive position, unable to change the camera angle or view point. Furthermore, they can only watch what has been recorded and provided to them and do not have the ability to select the viewing angles.

As an extension of the traditional single view video, EyeVision [1], is a sports broadcasting system co-developed by Carnegie Mellon University's computer vision professor Takeo Kanade. EyeVision employed 30 camcorders to shoot the game at Superbowl 2001. The videos captured from the 30 camcorders were all input to a video routing switcher and an edited video was broadcast to TV viewers. The EyeVision system, however, only provides users with one edited video without the ability for the user to select viewing directions and exercise camera control. It also only serves a TV audience and is not available in other multi-media formats.

In addition to EyeVision another multi-media device, a 3D video recorder, was designed for recording and playing free-viewpoint video [3]. It first captures 2D video and then extracts the foreground from the background. Source coding is applied to create 3D foreground objects (e.g., a human). However, like EyeVision, the 3D recorder does not allow the users to control the cameras. Additionally, the processing employed by the 3D video recorder necessitates the classification of the foreground from the background which requires substantial computational assets.

With the increasing demand for multi-view video, standardization efforts have occurred recently [4][5]. The MPEG community has been working since December 2001 on the exploration of 3DAV (3D Audio-Visual) technology. Many very diverse applications and technologies have been discussed in relation to the term 3D video. None of these applications focused on interactivity, in the sense that the user has the possibility to choose his viewpoint and/or direction within dynamic real audio-visual scenes, or within dynamic scenes that include 3D objects that are reconstructed from real captured imagery. With regard to the application scenarios it has been found that the multi-view video is the most challenging scenario with most incomplete, inefficient and unavailable elements. This area requires the most standardization efforts in the near future. Furthermore, no standardization efforts have dealt with interactivity.

Therefore, what is needed is a system and method for efficiently capturing and viewing video that has many streams of video at a given instance and that allows users to participate in viewing direction selection and camera control. This system and method should have a high degree of accuracy in its calibration and provide for efficient compression techniques. Furthermore, these compression techniques should facilitate the exhibition of various viewing experiences. Optimally the hardware should also be relatively inexpensive. Such a system should allow the viewing audience to participate in various viewing experiences and provide for special effects. Additionally, this system and method should be computationally efficient and should be robust to handling large amounts of image and audio data, as well as user interactions.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

As the use of cameras becomes more popular, computer processing power becomes stronger and network bandwidth becomes broader, users desire to leverage these advantages to pursue a richer multi-media experience. Moreover, it is highly desirable to capture comprehensively some important events, such as surgical and sports championship events, from different view points and angles.

The natural extension to the previously discussed single-view video form is the multi-view video form of the present invention. In multi-view video multiple videos of an event or event space are simultaneously captured at different view points and angles. These multi-view videos are compressed, transmitted, stored and finally delivered to users. One of the important features of the multi-view video of the invention is that users can control the capturing of videos and select the viewing of events from different directions.

The captured multiple video streams are formatted into a form of multi-view video or a video beam. The video beam consists of a set of video streams that were taken simultaneously of the same event from various viewing directions, which allows users to select viewing directions at any time instant. A storage scheme of the interactive multi-view video of the invention supports massive video data and efficient search of the video beam by multiple users simultaneously. In one embodiment of the invention, an index file scheme is created to speed up the search. Its core technique is to use index files to facilitate the search of the audio and video bit streams at any time instance.

Interactive multi-view video is a natural extension to the current single-view video that is popularly used in media streaming, broadcasting, and communication. Interactive multi-view video meets the trends of technology developments and customer demands. Interactive multi-view video may have a strong impact to various media applications like media players, messaging systems and meeting systems.

The interactive multi-view video system of the invention has many advantages. It provides users with the selection of video streams and control of the cameras which allow users to select viewing directions at any time instance. No classification of foreground and background objects is required for this interactive multi-view video system of the invention unlike the prior systems. Additionally, more efficient coding is adopted by the interactive multi-view video system than prior video systems, with a richer capability that facilitates the representation of special effects.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

FIG. 7 is a flow diagram depicting the on-line compression scheme for one camera of one embodiment of the invention.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
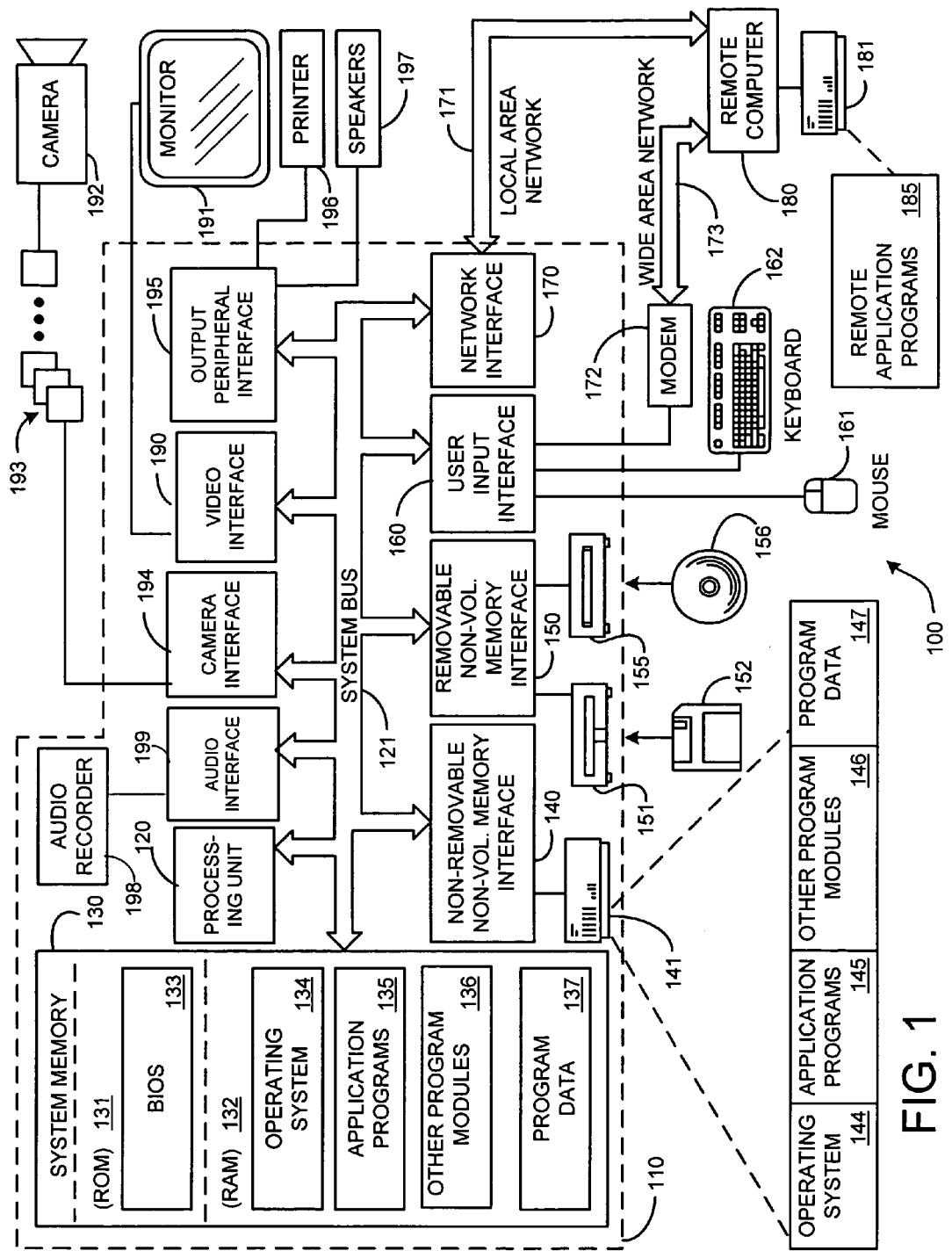
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192. An audio recorder 198 can also be connected to the computer via an audio interface device 199 for the purpose of capturing audio data.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System And Method For Interactive Multi-View Video

The system and method according to the invention is described in detail in the following sections. The system of interactive multi-view video consists of three primary parts: a capture component, a server component and a client component.

2.1. Capture Component

Figure 2:
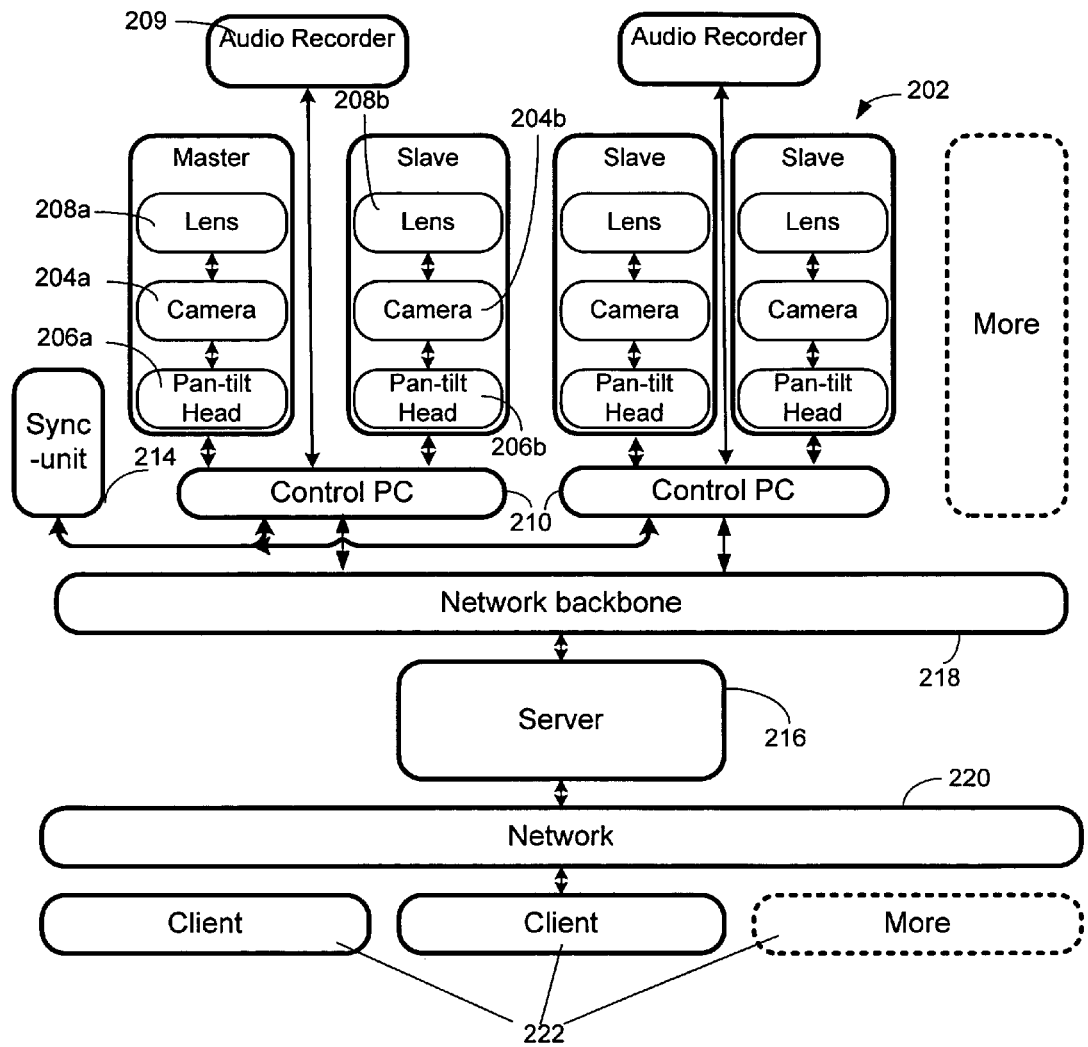
FIG. 2 is a simplified block diagram of the interactive multi-view video system according to the invention.

The capture component 202 of the interactive multi-view camera system of the invention is comprised of cameras (for example, video cameras), lenses, pan-tilt heads, control PCs and synchronization units. As shown in FIG. 2, in one embodiment of the invention, two video cameras 204a, 204b each having its own pan-tilt head 206a, 206b and lens (e.g. a zoom lens) 208a, 208b are connected to one control PC 210 and 1394 port (not shown), respectively. Each camera has its own ID number. The control PC 210 can change the view point and angle of the camera by controlling the pan-tilt head 206 and lens 208 via, for example, a RS232 interface. A synchronization unit 214 is linked to one or more control PCs 210 preferably through their 1394 ports or other suitable means. The capture component of the system can also include audio recording equipments 209 which record any audio at certain positions.

The synchronization unit 214 is used to make all of the cameras trigger and shoot at the same instant in time. Therefore, the control PCs can grab videos from the cameras simultaneously. From all of these cameras, one is selected to be a master camera, while the rest are called slave cameras. The master camera is controlled by a camera man, while the slave cameras can be driven to point to the same interesting point as the master camera. This is realized by a so-called master-slave tracking process. Typically the camera man is a person. In some cases, however, the master camera can be controlled by an object tracking algorithm without commands from a real camera man.

Control commands are input in the control PC of the master camera. The pan-tilt parameters are calculated and transmitted to other control PCs to drive all the slave cameras. Captured videos are received, compressed and transmitted to servers by the control PC. In one embodiment of the invention, each video is captured at a size of 640×480 and a frame rate of 30 frames per second. The detailed on-line compression procedure used in one embodiment of the invention will be presented in Section 3.1.

2.1.1 Camera Calibration.

Figure 3:
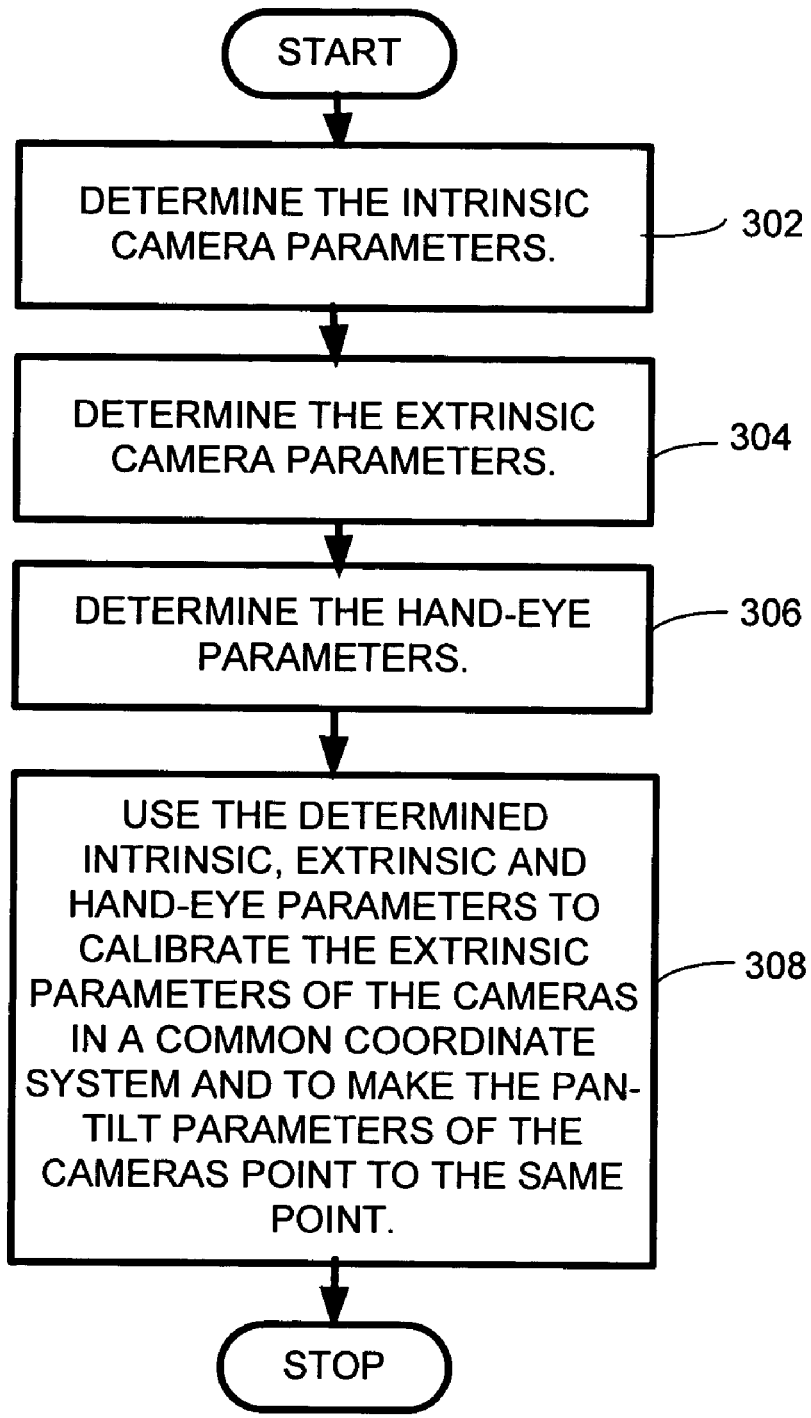
FIG. 3 is a simplified flow diagram of the overall calibration procedure employed in the interactive multi-view video system of the invention.

Before the master-slave tracking, the cameras should be calibrated. A calibration process that determines the intrinsic parameters, extrinsic parameters, and hand-eye relationship is employed in the multi-view video system of the invention. A general flow chart of this process is shown in FIG. 3. First, the intrinsic camera parameters are computed (process action 302), followed by the determination of the extrinsic camera parameters (process action 304). Then, the hand-eye parameters are determined (process action 306). Finally, the determined intrinsic, extrinsic and hand-eye parameters are used to calibrate the cameras by adjusting the extrinsic parameters of all cameras in a common coordinate system. Given all of these parameters and the pan-tilt parameters of the master camera, the pan-tilt parameters of the slave cameras which make the slave cameras point to the same interesting point as the master camera can be efficiently computed and adjusted.

The intrinsic parameters are defined using the basic pinhole camera model. They are only dependent on the intrinsic structure of the camera. They include the ratio of the focal length to the width of one image pixel, the ratio of the focal length to the height of one image pixel, the x coordinate of the principle point and the y coordinate of the principle point. The extrinsic parameters are not dependent on the intrinsic structure of the camera. They define the location and orientation of the camera reference frame with respect to a known world reference frame. They typically include a rotation matrix and a 3D translation vector. The hand eye relationship parameters include the location and orientation of each camera with respect to its pan tilt head.

Two calibration methods, pattern-based calibration and pattern-free calibration, are adopted in the multi-view interactive video system and method of the invention. The pattern-based calibration is realized by using a large calibration pattern, preferably placed at the ground plane or other suitable reference plane, while the pattern-free calibration exploits the information brought by the ground plane. These two methods are described in more detail below.

2.1.2 Pattern-Based Calibration.

In one embodiment of the invention, a plane-based algorithm [2] is used to calibrate the intrinsic parameters due to its accuracy and simplicity. Such calibration should be performed only once over weeks as the intrinsic parameters vary very slightly. The extrinsic parameters of all cameras are calibrated in a common world coordinate system, preferably in the coordinate system of the pattern plane. Then the hand-eye relationship of each camera is also calibrated from its extrinsic parameters at no less than three pan-tilt positions.

Figure 4A:
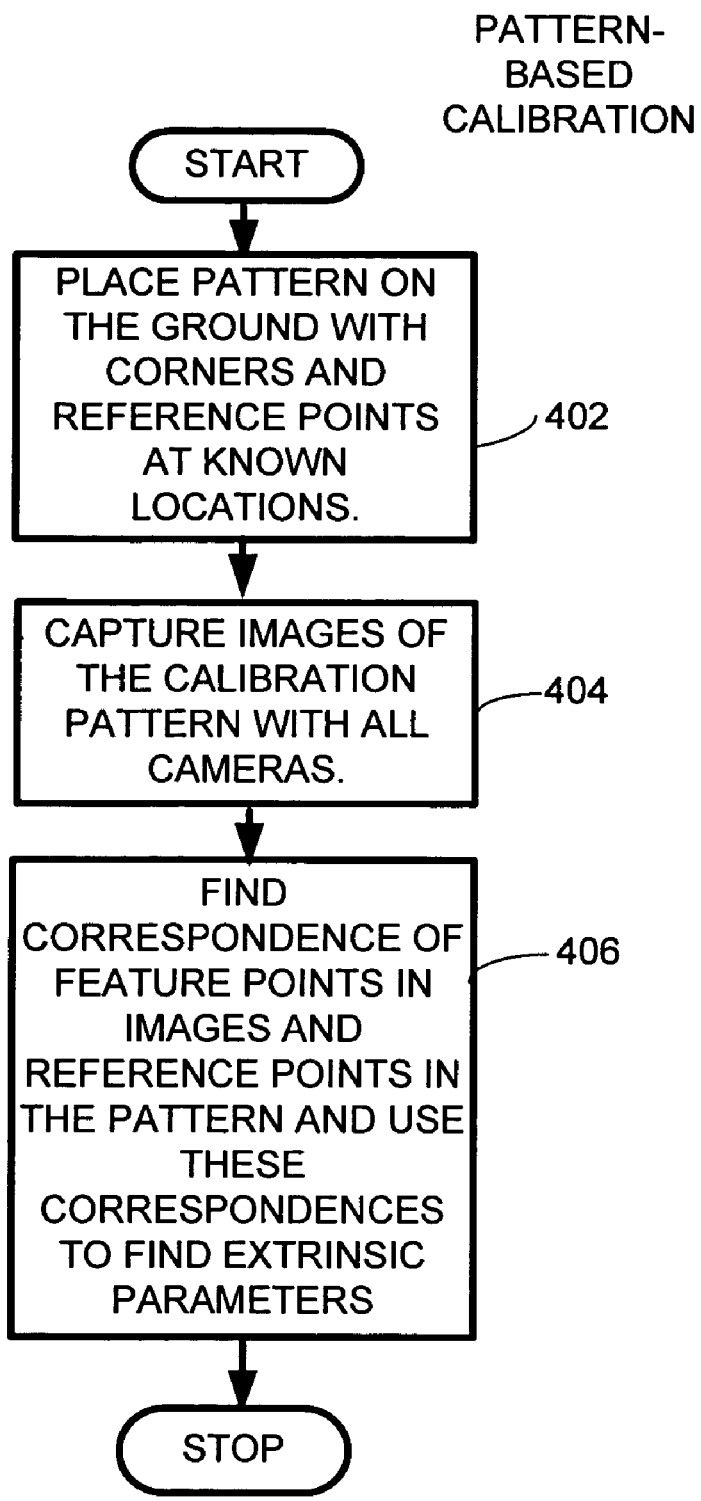
FIG. 4A is an image of an exemplary calibration pattern used in one embodiment of the system and method according to the invention.

The pattern-based method uses images of a planar pattern with precisely known geometry. To make the pattern-based calibration automatic, in one embodiment of the invention a special calibration pattern was designed, shown in FIG. 4A, which uses three kinds of colors (red, green, blue), to encode the positions of all corner points. An automatic procedure was designed to capture the image of the pattern by the cameras undergoing different pan-tilt motions, and then, to detect the corners of the pattern along with the color-encoded positions.

Figure 4B:
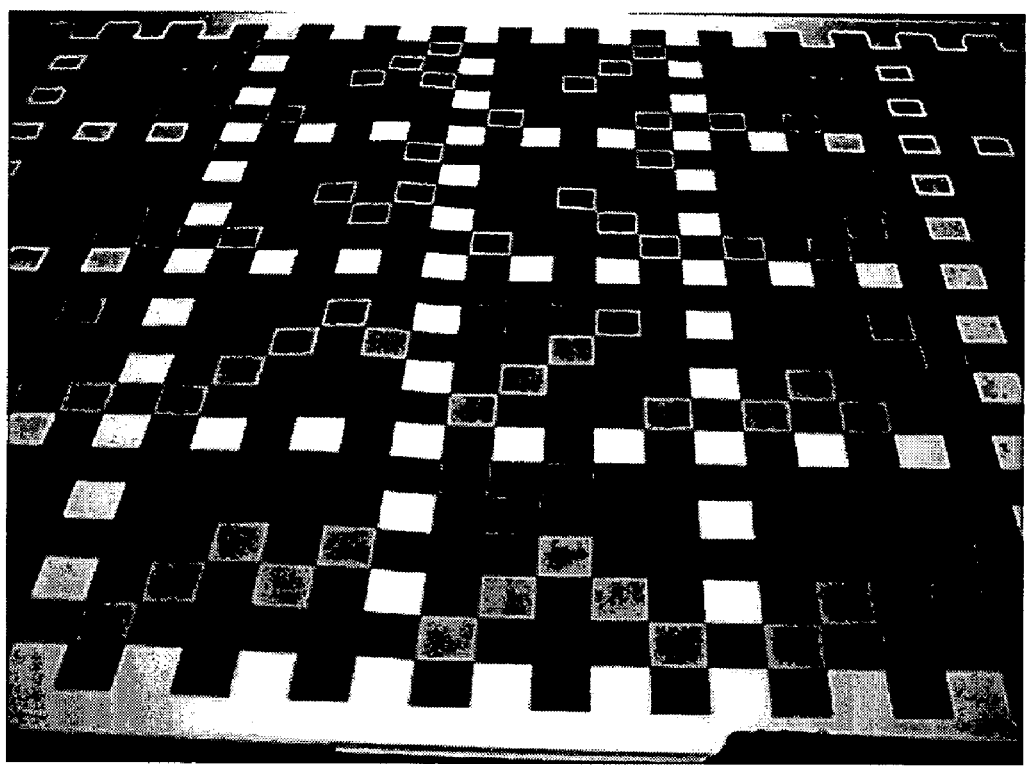
FIG. 4B is a flow diagram of the pattern-based calibration employed in the interactive multi-view video system of the invention.

A simplified flow diagram of the pattern-based calibration is shown in FIG. 4B. The pattern is placed on the ground or other suitable reference frame with its corners and possibly other reference points placed at known locations (process action 402). All cameras then capture an image of the calibration pattern (process action 404). By finding and using the correspondence between feature points extracted from the images and the reference pattern points whose coordinates are known the extrinsic camera parameters can be precisely estimated (process action 406) using conventional techniques. In order to obtain an accurate calibration, the reference pattern should be precisely manufactured, and it should occupy the major part of the image used for calibration. Furthermore, in a large scale system, setting up a large reference pattern with great accuracy is not a trivial task that requires special equipment. In order to avoid the inconvenience, a pattern-free calibration method was developed and is described below.

2.1.3 Pattern Free Calibration.

2.1.3.1 Overview of the Pattern Free Calibration Procedure.

Figure 5:
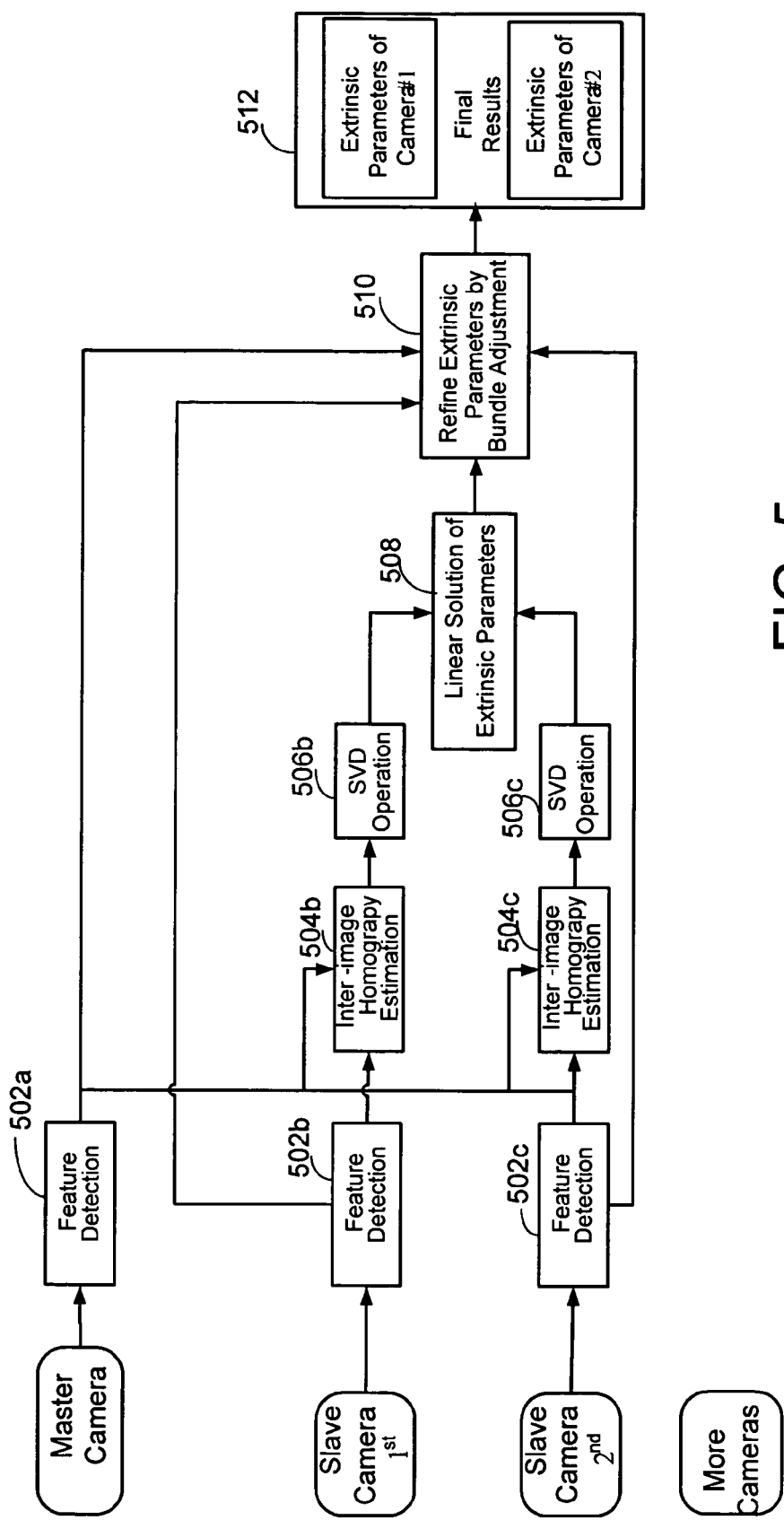
FIG. 5 is a flow diagram of the pattern-free calibration employed in the interactive multi-view video system of the invention.

In one embodiment of the invention, an automatic pattern-free calibration tool is employed. In contrast with the pattern-based method which uses the correspondences between image points and pattern points to determine the cameras extrinsic parameters, the pattern-free calibration method is based on the correspondences between image points from different cameras. FIG. 5 provides a general flow diagram of the pattern free calibration procedure of the interactive multi-view video system of the invention. First, as shown in process action 502, one extracts the feature points in each image of both the master and slave cameras. Using these feature points, a set of inter-image homographies are estimated that map the features in each image to the image of the master camera (process action 504). Then, a linear solution of the extrinsic parameters can be obtained based on these homographies, preferably using a Singular Value Decomposition (SVD) operation, as shown in process actions 506 and 508. SVD is a classical mathematical operation which can be used to find the eigen values and eigen vectors for a matrix. In the method used in the invention, SVD is used to find the eigen values and their corresponding eigen vectors for the product matrix of the homography of the feature points and its transpose. Based on these obtained eigen components, the cameras' extrinsic parameters can be estimated as a Least Square Solution to a set of linear equations. After this, as shown in process action 510, a bundle adjustment of the extrinsic camera parameters is applied to refine them by minimizing the sum of re-project errors of all feature correspondences. Using the estimated extrinsic parameters, one can project the features in the master image (e.g. taken by the master camera) onto slave images (e.g., taken by the slave cameras). The term "re-project errors" refers to the errors between these features projected onto the slave images and their corresponding features in the master image. Using the sum of the project errors is a conventional way of evaluating the accuracy of calibrated parameters. In one embodiment of the invention, the estimated parameters are refined by minimizing the sum of project errors using a Levenberg-Marquardt (LM) method.

2.1.3.2 Homography Estimation.

The pattern-free calibration technique of the invention can be more specifically described as follows. In most environments, there is always a dominating plane, typically the ground plane. When multiple cameras are set up in such a scenario, each of the cameras forms an image of a common plane such as the dominating plane. For example, two images from two cameras (one the master camera, and the other a slave) with different positions looking at the ground plane are linked by a 3×3 homography H defined by $$H \cong A_2 \left( R + \frac{tn^T}{d} \right) A_1^{-1}$$

where $A_1$ and $A_2$ are the intrinsic matrices of the master and slave cameras, respectively. The symbol $\cong$ denotes equal up to a nonzero scale, because the homography can only be estimated up to a scale. R and t are the extrinsic parameters of the slave camera (rotation and translation) in the reference coordinate frame of the master, and, n is the unit normal vector of the ground plane.

Given more than four point correspondences between the two images (they are not co-linear), there are various conventional techniques by which a homography can be estimated. For example, the homography can be estimated by a basic computer vision algorithm named Direct Linear Transform (DLT). One embodiment of the invention employs a Random Sample Consensus (RANSAC) technique to estimate the homographies. This method consists of five steps:

1. Detecting feature points. In one embodiment a corner detection operator is used to detect features from two images.
2. Obtaining a hypothesis of corresponding feature sets by exploiting the inter-image similarity of intensity around feature points.
3. Initializing the homography by a RANSAC algorithm.
4. Refining the homography to minimize the re-projection error in all corresponding feature pairs by Levenberg-Marquardt algorithm.
5. Using the estimated homography to find more corresponding feature pairs. Here, Step 4 and 5 can be iterated several times to improve the homography.

Once the homographies are obtained, the camera extrinsic parameters can be linearly estimated by the following process.

2.1.3.3 Determination of Extrinsic Parameters.

For a homography H, one denotes $A_2^{-1}HA_1$ by M, and M's eigen vectors by $v_j$ (j=1,2,3). According to the properties of H, one can establish three equations about n.

$$\begin{cases} v_1^T n = 0 \\ v_2^T n = \text{sign}(b_2)|b_2|(a_2+1) \\ v_3^T n = \text{sign}(b_3)|b_3|(a_3+1) \end{cases}$$

Where $b_j$ and $a_j$ are two intermedial variables, and the value of $|b_j|$ and $a_j$ can be derived from the eigen values of M. This means that from one inter-image homography, one can obtain three equations of n with unknown signs. If one has m+1 images of the planar scene captured by m+1 cameras including a master camera, one can estimate m homographies from the master image to the other images. And then, the eigenvalues and eigenvectors from each M can be further determined. Based on these, the above constraints can make up a set of 3 m linear equations. This presents a potential way to estimate the normal vector n. In practice, one can obtain an initial value of n by an initialization step, and then, the signs in the above equations can be determined. Based on this, n can be further estimated. In one embodiment of the invention, a voting based initialization step is adopted to determine the sign of $b_j$, because two possible solutions can be obtained from one homography.

More specifically, the overall procedure can be described as:

Step 1. Acquire images; detect feature points; and estimate homographies H via conventional methods or as described above.

Step 2. Calculate the eigenvalues and eigenvectors of $M^TM$ by a standard SVD decomposition operation.

Step 3. Estimate an initial value for the normal vector n by a voting method.

Step 4. Determine the signs in equations, and then, refine the vector n.

Step 5. Estimate the translation t (up to scale) and rotation R.

Step 6. Bundle-adjust the extrinsic camera parameters by minimizing the sum of re-project errors of all feature correspondences.

2.2. Server Component

The server is the most powerful unit in an interactive multi-view video system. It manages the transmission and storage of massive video datum and provides services for many clients. As shown in FIG. 2, the server 216 is connected to two networks 218, 220. A network 218, such as for example a wide band network backbone, is adopted to connect the server 216 and control PCs 210 so that the compressed videos can be delivered from the control PCs 210 to the server 216. In one embodiment of the invention, the multi-view video system of the invention uses a 1 GB network to connect the server 216 and all control PCs 210. An outside network 220 (e.g., a LAN, a WAN, or even the Internet) is used to connect the server 216 with clients 222. In one embodiment of the invention, the client 222 is connected to the server 216 via a 10/100 MB or above network. In another embodiment of the invention, the client 222 is connected to the server 216 via the Internet.

2.2.1 Multi-View Video Format.

Figures 6A, 6B:
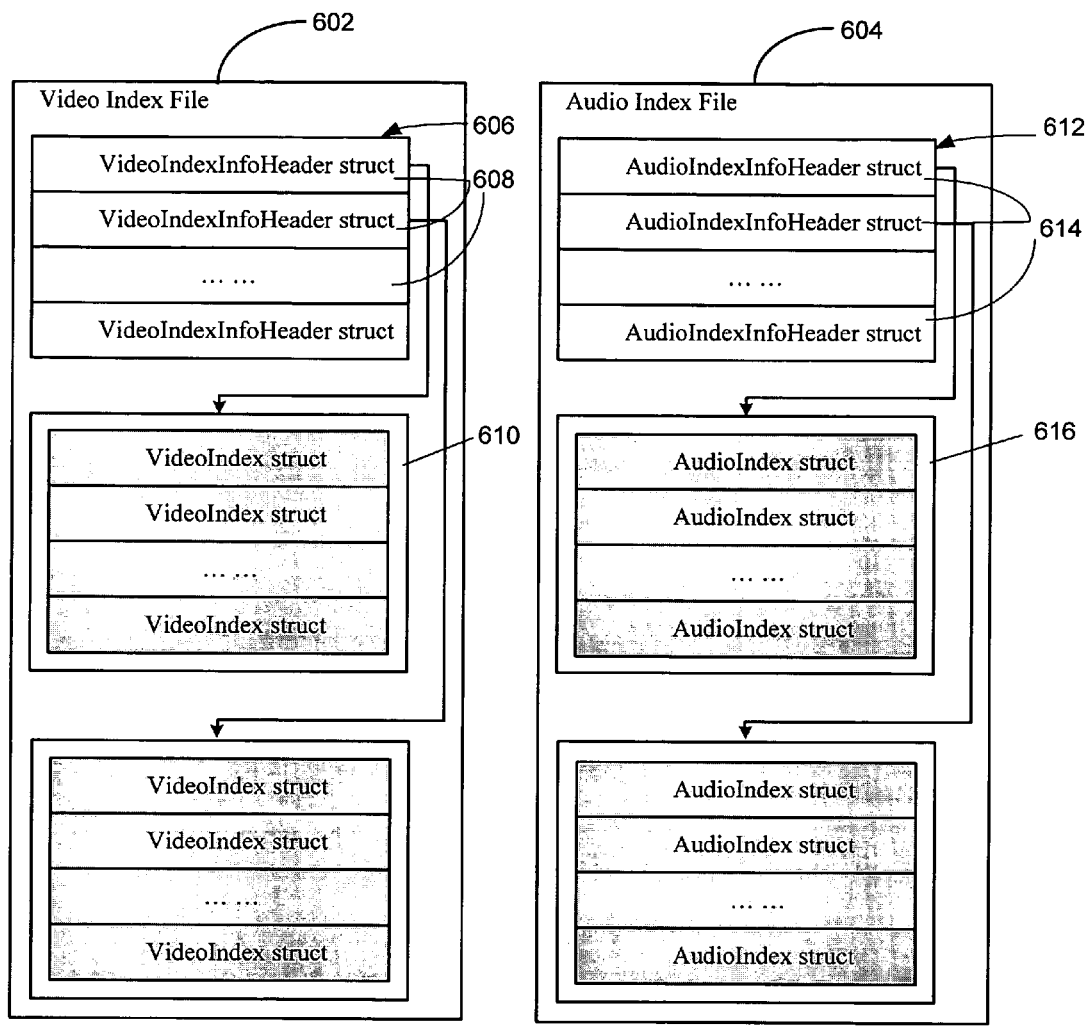
FIG. 6A is a diagram of the video index table used in the interactive multi-view video system of the invention.
FIG. 6B is a diagram of the audio index table used in the interactive multi-view video system of the invention.

The server 216 receives the videos from control PCs 210, and then saves them into a form of multi-view video or video beam. The video beam consists of a set of video and preferably audio streams that were taken simultaneously of the same event or event space. The storage scheme of the interactive multi-view video of the invention supports massive video data and efficient search of the video beam. In one embodiment of the invention, an index structure is created to speed up the search. The multi-view video of the invention is capable of maintaining the huge video beam and supporting a vast number of users accessing the beam simultaneously. Its core technique is to use an index to facilitate the search of audio and video bit streams at any time instance. Examples of these index structures are shown in FIGS. 6A and 6B. FIG. 6A depicts the format of the video bit streams 602 and FIG. 6B depicts the format of the audio bit streams 604 that correspond with the video bit streams. The actual video and audio data, along with the index files, are often stored on the server. They can also be stored locally at the client for off-line playing. For example, the video beam can be stored on a DVD disc and be played by any PC at the client.

Since the size of multi-view video might be very huge, a 64-bit pointer is used to represent the starting-point of any compressed multi-view video frame in one embodiment of the invention. On the other hand, a 32-bit pointer is sufficient to be used to represent the starting-point of any compressed audio frame. Moreover, to reduce the time consumption of locating the video bit stream as well as to reduce the size of the video index file, the 64-bit pointer is split into a 32-bit high-address pointer and a 32-bit low-address pointer. A flag (e.g., named 'bCross4G') is used to signal whether there is a transition in the high-address pointer or not. If the flag is set to 'true', then the low-addresses should be checked. In that case, if the value of the current low-address is smaller than that of the previous low-address, the high-address should be increased by 1 for the remaining pointers starting from the current one.

The index of audio and video are saved to different files separately. The video index file is organized by a layered structure. The first layer is composed of many fields 606 (e.g., 'VideoIndexInfoHeader' fields), each of them containing a timestamp, an offset of the video index data, a 32-bit high address, a flag indicating whether there is a transition to a high address pointer or not (e.g., a 'bCross4G' flag), and the number of cameras employed at that time instant. The second layer contains the detailed video index data 610 (e.g., 'VideoIndex' fields) with the same time stamp pointed by the first layer 608 as shown in FIG. 6A. Each field of the second layer consists of a camera ID, a coding type of that frame, and a 32-bit low-address pointer. Notice that the number of 'VideoIndex' fields for a certain time stamp equals the total number of cameras represented by the 'byCameraNum' in the 'VideoIndexinfoHeader' field. Also note the number of cameras at different time stamps could be different.

An example of the structure of the video index is shown below.

```
// first layer
Struct VideoIndexInfoHeader
{
    DWORD       dwTimeStamp;    // time stamp of multi-view video
    DWORD       dwOffset;       // 32-bits offset of the VideoIndexHeader
    DWORD       dwOffsetHigh;   // the high-address of the offset
    BOOL        bCross4G;       // indicate whether the offsets have the same
dwOffsetHigh or not
    BYTE        byCameraNum;    // total number of cameras at that time stamp
}
//second layer
Struct VideoIndex
{
    BYTE        byCameraID;     // the ID of camera, maximum 255
    BYTE        byFrameType;    // coding type of the video frame
    DWORD       dwOffsetLow;    // the low-address pointer
}
```

The audio index file 604 is organized by a layered structure as well. The first layer is composed of many fields 614 (e.g. 'audioIndexlnfoHeader'), each of them containing a timestamp, an offset of the audio index data, and the number of audio records at that time instant. The second layer 616 contains the detailed audio index data (e.g., 'AudioIndex' fields) with the same time stamp, as shown in FIG. 6B. Notice the number of 'AudioIndex' fields for a certain time stamp equals the total number of audio streams represented by 'byAudioNum' in the 'AudioIndexlnfoHeader' field. Also note that the number of audio streams at different time stamps could be different.

An example of the structure of the audio index is shown below.

```
// first layer
Struct AudioIndexInfoHeader
{
    DWORD       dwTimeStamp;    // time stamp of multi-view video
    DWORD       dwOffset;       // 32-bits offset of the AudioIndexHeader
    BYTE        byAudioNum      // total number of audios at that time stamp
}
//second layer
Struct AudioIndex
{
    BYTE        byAudioID;      // the ID of audio, maximum 255
    DWORD       dwOffset;       // the 32-bits pointer
}
```

2.3 Client Component

The received video beam can be either used directly for on-line interactive service or saved to disk for off-line processing. In the context of one embodiment of the system and method according to the invention, on-line means the watched video beam is captured in real time. Off-line means the video beam has been captured and stored at a storage medium. There are two types of off-line playing. One is that the video beam is stored at the server and the client plays it by a streaming process, as is done in video on demand (VOD) for example. In this mode, the server acts as a streaming server. Thus, this type of off-line playing is referred to as "Streaming Services". The other type of off-line play back occurs when the video beam is stored at a local disk or another place. In this mode the client can play it without the help of the server.

For on-line interactive service, the server responds to user commands from clients. The commands supported in one exemplary embodiment of the invention include: switch, sweeping, freeze and rotate, and history review in addition to conventional commands in a typical media player such as a VCR. According to the user commands, the server generates a video stream from the captured videos and then sends it to the client. In one embodiment of the invention, there are two communication channels for one client. One is a User Datagram Protocol (UDP) channel which is used to transmit audio/video data to reduce latency, and the other is a Transmission Control Protocol (TCP) channel used to transmit command and control data for controlling the capturing cameras to ensure correctness. For off-line processing, the video beam is transcoded to further reduce the data amount. The detailed off-line compression procedure will be presented in Section 3.2. The details of the client component are discussed below.

2.3.1 On-Line Services.

In on-line services, clients can remotely connect to the server in a LAN, a WAN, and even the Internet. Once the connection between the client and the server is established, the user can subscribe in the client part to the conventional commands as in a typical media player and also subscribe to the ability to issue unique commands (such as, for example, switching, sweeping, freeze and rotate, and history review) as in interactive multi-view.

The clients send their commands to the server. In response to the users' commands, the server will generate and transmit the expected video to each client according to user's commands, respectively. In a word, users can play the multi-view video interactively. In some cases, the users can also input parameters such as camera ID and pan-tilt values to the client. The client can transmit these parameters to the server and then to the control PCs to control the capturing cameras.

2.3.2 Off-Line Services.

In off-line playing, the client can directly open a multi-view video beam which is stored at a local disk or another place and play it. In addition to conventional effects as those in a typical video player (for example, play, fast forward, rewind, pause, stop and so forth) users can experience some fancy special effects including switching between different video streams, a sweeping effect and a freeze-and-rotate effect, for example. A brief description of these special effects is provided below.

In streaming mode, the client can remotely connect to the server via a LAN, a WAN, and even the Internet as in the on-line mode. In this mode the server component acts as a streaming server managing the clients' connections and video beams, and users can subscribe their commands to the server to select their desired contents from video beams, and to view different video effects (for example, switching, sweeping, freeze and rotate history review and script). This mode is an extension of current Video on Demand (VoD) systems. The main difference between streaming services and on-line service is that in the streaming mode, the video beams have been captured and stored at the server component, and are not captured in real time. The streaming services support all the user commands list below.

Switching Effect: The switching effect involves the user being able to switch between one camera viewpoint and another as the video continues in time. This involves accessing the video streams from different cameras that provide the desired point of view. One example is that a user switches from the viewpoint of the second camera in a sequence to the viewpoint of the fifth camera.

Sweeping Effect: The sweeping effect involves sweeping through adjacent camera views while time is still moving. It allows the user to view the event from different viewpoints. One example is that, assuming there are eight viewpoints in total, a user starts from the first viewpoint, and switches continuously to the second viewpoint, the third viewpoint and so on until the eighth viewpoint, and then watches at the eighth viewpoint.

Freeze and Rotate Effect: In the freeze and rotate effect, time is frozen and the camera view point rotates about a given point. One example is that, assuming there are eight viewpoints in total, a user starts from the first viewpoint, and switches continuously to the second, the third, and so on until the eighth viewpoint back and forth.

History Effect: In the history effect the user can play back the previously viewed or created video sequence.

Script: The user can also create a script of a set of views and special effects that can be played on demand. He or she can also send this script to other users who will, when the script is activated, observe the same scripted video events.

The Sweeping, Switching, and Freeze and Rotate effects can also be available in the on-line mode.

3.0 Compression Procedures

Both on-line and off-line compression procedures can be used with the interactive multi-view video system and method of the invention. The on-line compression procedure is designed for real-time multi-view video capturing. Its outputs may be either used directly for on-line service, or saved to disk for future processing (for example further off-line compression or future play back). The off-line compression procedure is adopted in the transcoding process to compress the pre-encoded bit stream much more efficiently. After that, the output bit streams are saved on disk for storage and off-line services.

It should be noted that although specific novel on-line and off-line compression procedures are described in the sections below, the system and method of the invention are not limited to these types of compression. Conventional compression algorithms could also be used.

3.1 On-Line Compression

In general, similar to the conventional single-view video coding, in the on-line compression used in one embodiment of the interactive multi-view video system of the invention, each view of video can be coded in a format of IPPP frames.

By way of background, typical video compression utilizes two basic compression techniques inter-frame (P-frame) compression and intra-frame (I-frame) compression. Inter-frame compression is between frames and is designed to minimize data redundancy in successive pictures (e.g., temporal redundancy). Intra-frame compression occurs within individual frames and is designed to minimize the duplication of data in each picture (e.g., spatial redundancy). In conventional video coding, intra-picture frames essentially encode the source image in the JPEG format (with some differences). Typically blocks of pixels are run through a Discrete Cosine Transform (DCT) and are quantized on a per-macroblock basis. Intra-picture frames are not dependent on any other frames and are used as 'jump-in' points for random access. Inter-frames, sometimes called predicted frames (P-frames), make use of the previous I or P frame to 'predict' the contents of the current frame and then compress the difference between the prediction and the actual frame contents. The prediction is made by attempting to find an area close to the current macroblock's position in the previous frame, which contains similar pixels. A motion vector is calculated which moves the previous predicted region (typically with half pixel accuracy) to the current macroblock. The motion vector may legitimately be a null vector if there is no motion, which of course encodes very efficiently. The difference between the predicted pixels and their actual values are calculated, DCT-transformed and the coefficients quantized (more coarsely than I frame DCT coefficients). If a sufficiently similar group of pixels cannot be found in the previous frame, a P frame can simply spatially encode the macroblock as though it were an I-frame.

Like conventional video coding, there are two types of frames in the on-line compression algorithm of the invention: 'I' frames and 'P' frames. The compression of each 'I' frame is only based on the correlations of that frame; while the compression of 'P' frame is based on the correlations of that frame and its previous frame. Basically speaking, the compression efficiency of the 'P' frame is much higher than that of the 'I' frame. Although the 'I' frame cannot give efficient compression, it is very robust to errors. Moreover, since each 'I' frame does not depend on other frames, it can be easily accessed. This is why a typical video encoder will compress frames as 'I' frame periodically.

A big difference from the conventional schemes and the on-line compression of the interactive multi-view video system of the invention, however, lies in a unique "STATIC" mode that is introduced to speed up the predictive coding. To find the STATIC mode, it is necessary to calculate the difference between the original image and a reference image. To further reduce the computing complexity, the decision of whether to use this STATIC mode or not is determined jointly among all views. In this joint decision, the static regions of a certain view are first detected. Then their corresponding regions overlapped by the neighboring views are considered to be likely STATIC. And finally a very simple check is applied to confirm the decision (In one embodiment of the invention, only a small portion of pixels are used to calculate the difference between the original image and the reference image). In the STATIC mode, the involved macroblock (MB) will be coded like the traditional INTER mode, while its corresponding reference image, which will be used by the next frame for temporal prediction, is simply copied from its previous reconstructed image. As a result, none of de-quantization, inverse DCT and motion compensation is required for creating the reference image of this MB.

In addition to the new coding mode, joint motion estimation (ME) is also applied to reduce the complexity of ME. In this new ME, traditional ME is first applied for a certain view. A 3D MV is then created based on the found MV of that view. After that, the 3D MV is projected to the neighboring views to predict their own MV. Based on the predicted MV, the search range of these views can be reduced and thus complexity can be significantly reduced. For example, in conventional single-view video coding, an encoder typically has to search within a 32×32 region in order to find the motion vector of a certain macroblock. But in the multi-view video coding of the system and method according to the invention, once the 3D motion is obtained and projected to a certain view, the search range of that view can be narrowed down (say, for example, to 8×8 pixels), thus the computation of finding the motion vector of that view is significantly reduced. On the other hand, this also implies that the motion vectors of different views are correlated. Hence, these motion vectors can be further compressed.

In one embodiment of this invention, only the difference between the true motion vector V and the predicted vector $\hat{V}$ obtained from other views are encoded.

A general exemplary flow chart of the on-line encoding scheme of the invention for one camera is shown in FIG. 7. In this example, it is assumed that the system has three video cameras each capturing video at 30 frames per second. The frame size is therefore 640×480 pixels. Hence, one needs to compress 3×30 frames per second. The compression of frames captured by a single camera is considered first, then the case of multiple videos is discussed.

As shown in FIG. 7, process action 702, when encoding a frame, one first partitions the frame into blocks, preferably macroblocks (MBs), no matter what type of frame it is. The size of a MB is 16×16 pixels—that is, in the above example, one gets 640×480/16/16 MBs per frame. Each frame is then compressed according to the pre-determined coding type. For each 'I' frame, all MBs are coded with intra-mode (process actions 704, 708); whereas for the 'P' frame, there are three coding modes can be chosen when encoding each MB. The mode decision is MB-based. In other words, different MBs in a 'P' frame could have different coding modes. In order to determine which mode to use, the encoder first performs a motion estimation operation for each MB to calculate the similarity of the current frame and its previous frame (process action 710). If the difference is very large, which indicates there is almost no correlation for that MB, the intra-mode will be chosen (process actions 712 and 714). If the difference is very small, the 'STATIC' mode will be chosen (process actions 716, 718). As for the remaining case, the 'INTER' mode will be chosen (process action 720). This is the mode decision for the input from one video stream only.

Figure 11A:
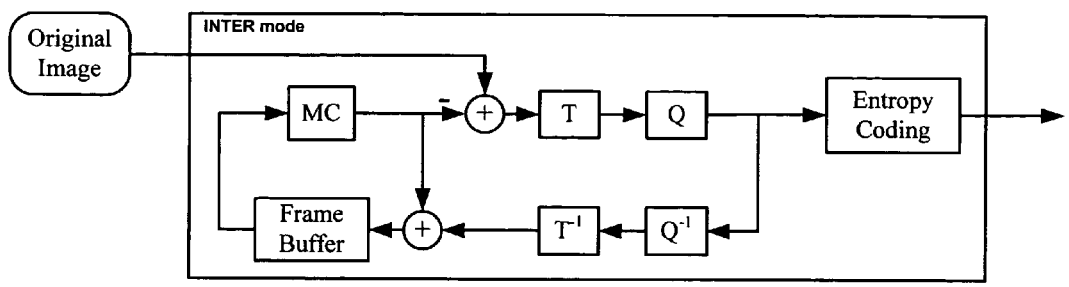
FIGS. 11A, 11B and 11C are schematics of the encoding architectures, inter-mode, intra-mode and static mode, respectively, of one embodiment of the invention.
Figure 11B:
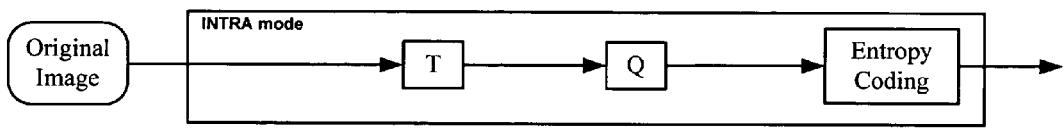
Figure 11C:
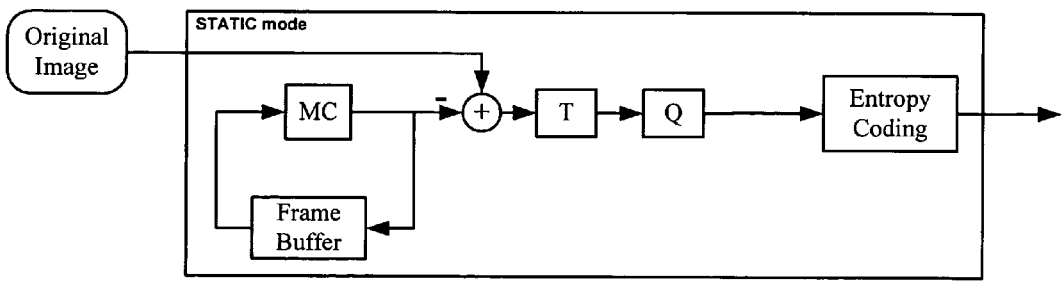

Below is the description of the three encoding modes for the on-line compression. FIGS. 11A, 11B and 11C show the encoding architecture for the above described modes (inter-mode, intra-mode and static mode, respectively).

Figure 8:
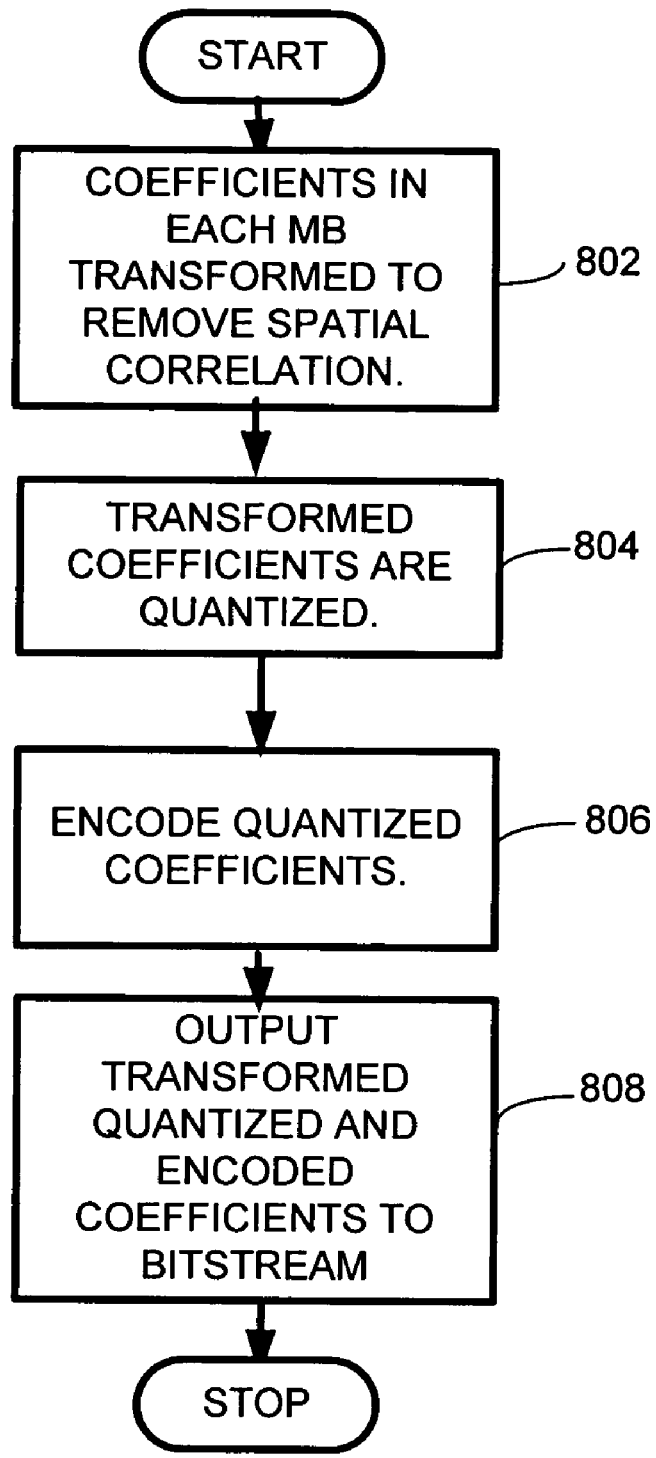
FIG. 8 is a flow diagram depicting the intra-mode encoding of one embodiment of the invention.

1) Intra-mode: As shown in FIG. 8, the coefficients in each MB are first transformed by a transformation or 'T' module to remove their spatial correlations (process action 802). After that, the transformed coefficients are quantized by a 'Q' module (process action 804). (A simple example of the quantization process is as follows: assume that one has two coefficients 67 and 16, and the quantization level is 64. After the quantization, the first coefficient becomes 64, while the second coefficient becomes 0. One can see that the purpose of quantization is to remove the uncertainty of the coefficients so that they can be coded easily. Of course, some of the information will be lost after the quantization). The quantized coefficients are encoded (e.g., by using an 'Entropy Coding' module) (process action 806). Finally, one obtains the compressed bit stream (process action 808).

Figure 9:
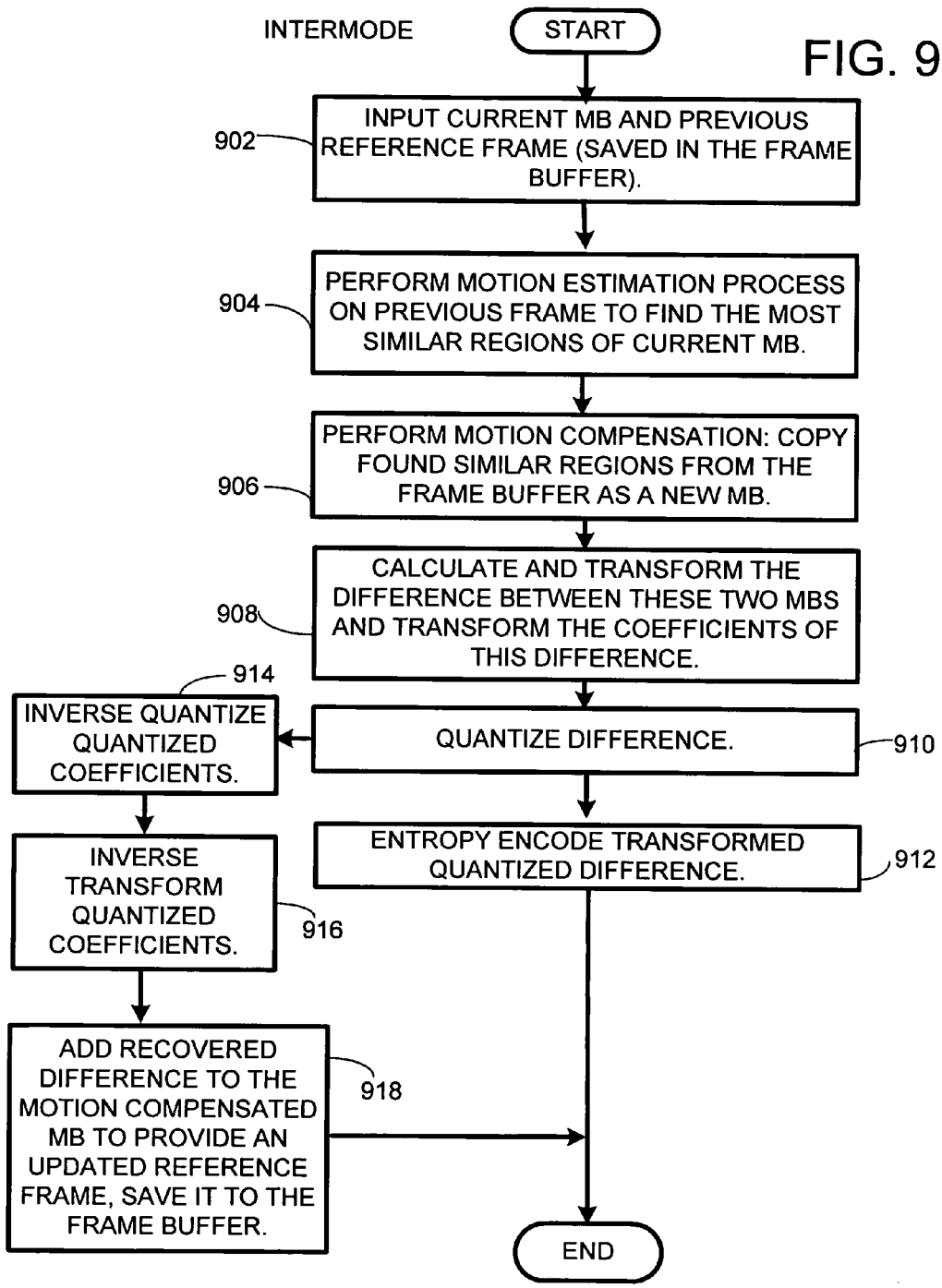
FIG. 9 is a flow diagram depicting the inter-mode encoding of one embodiment of the invention.

2) Inter-mode: As shown in FIG. 9, the current MB and previous reference frame are first input (process action 902). A 'motion estimation' process is then performed on the previous reference frame, which is saved in the 'Frame Buffer', to find the most similar regions of current MB (process action 904) (Note that the motion estimation process is typically performed on the current MB by the mode decision process as shown in FIG. 7 so it is not necessary to do it again here.). After that, as shown in process action 906, a Motion Compensation operation is applied to copy the found regions from the 'Frame Buffer' by a motion compensation (MC) module. Now one has two MBs, one is from the original frame and the other is from the 'MC' module. These two MBs are similar, however, there is still some difference between them. Their difference, called the residue, is then transformed by the 'T' module and quantized by the 'Q' module (process actions 908 and 910). Finally, the quantized results are coded by an 'Entropy Coding' module (process action 912). It is also necessary to update the reference image for the next frame. This is achieved by an inverse quantization module ('Q–1') and an inverse transform module ('T–1') (as shown in process actions 914 and 916), and then adding the recovered residue as a result of these actions onto the motion compensated results (process action 918). After that, the encoder has the same reference image as that in the decoder.

Figure 10:
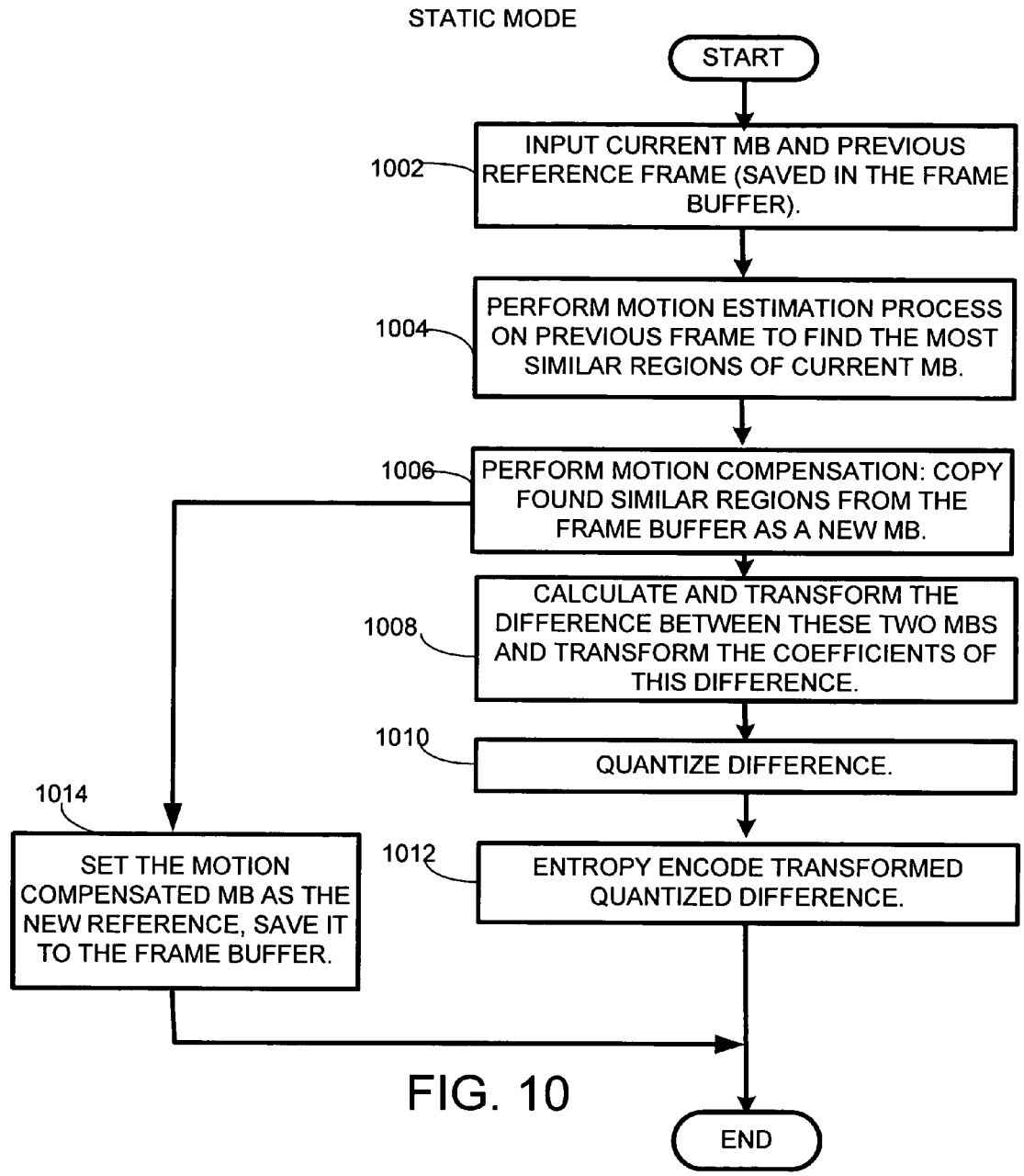
FIG. 10 is a flow diagram depicting the static mode encoding of one embodiment of the invention.

3) Static mode: The static mode is the new mode employed by the system and method of the invention. Its first part is very similar to that of the inter-mode. However, there is a big difference in the second part, i.e., creating the reference frame. In this new mode, the new reference is just copied from the previous one; whereas in the previous INTER mode, inverse quantization, inverse transform and residue adding are required. As a result, a vast amount of computation can be saved. A flow diagram of static mode processing is shown in FIG. 10. As shown in FIG. 10, the current MB and previous reference frame are first input (process action 1002). A 'motion estimation' process is then performed on the previous reference frame, which is saved in the 'Frame Buffer', to find the most similar regions of current MB (process action 1004). (Note that the motion estimation processed is typically performed by the mode decision process as shown in FIG. 7. So it is not necessary to do it again here.) After that, as shown in process action 1006, a 'MC' module (i.e., Motion Compensation) is applied to copy the found regions from the 'Frame Buffer'. Then, one has two MBs, one is from the original frame and the other is the result from the 'MC' module. The difference between these two MB is then transformed by the 'T' module and quantized by the 'Q' module (process actions 1008 and 1010). Finally, the quantized results are coded by the 'Entropy Coding' module (process action 1012). As for the new reference frame, it is simply obtained by copying the motion compensated MB (process action 1014). It is important to point out that, in this STATIC mode, the MB is not necessary to be really static, it could contain motion. Moreover, when the mode decision threshold determining whether to code the MB as a INTER mode or a STATIC mode becomes very large, most of INTER mode MBs will be coded as STATIC mode. In that case, the complexity can be reduced significantly, while the performance will be sacrificed a bit. In one embodiment of the invention, the above mode decision threshold is controlled to achieve an appropriate tradeoff between the complexity and performance.

The decoding process is just the inverse of the encoding process. For example, the compressed bit stream is first put into an entropy decoder to attain the quantized coefficients (as well as other necessary information such as the coding mode of each MB). For each MB, according to their coding mode, the quantized coefficients are then de-quantized, inverse transformed, and so on.

Figure 12A:
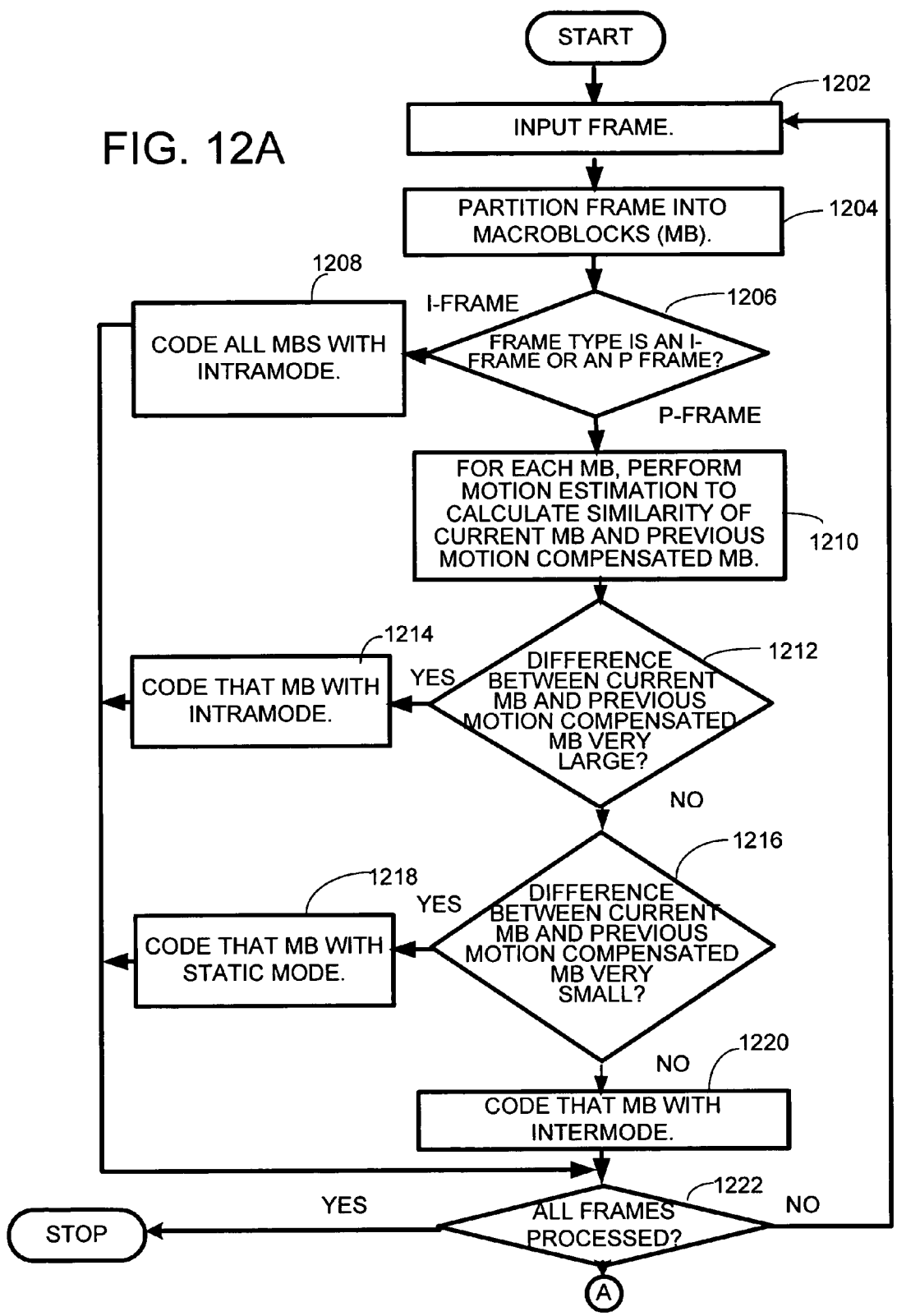
FIGS. 12A and 12B provide a flow diagram depicting the encoding logic for encoding the bit streams of multiple cameras.
Figure 12B:
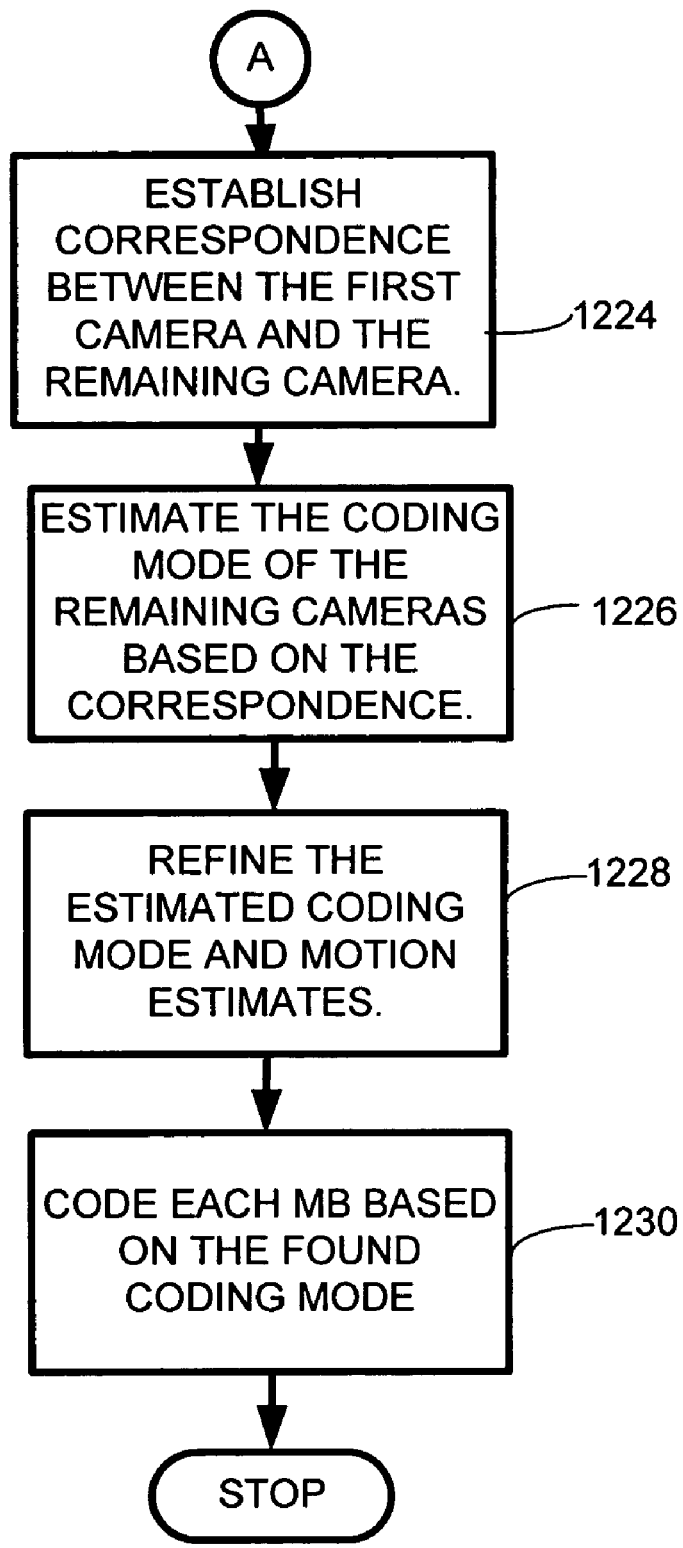

How about the mode decision for multiple cameras then? Referring back to the three cameras case and to FIGS. 12A and 12B. Video from the first camera will perform the mode decision exactly as presented before (process action 1202-1222). After that, one tries to establish the correspondence between the first camera and that of the remaining two cameras (process action 1224) using epipolar geometry and similarity of the image regions. Based on the correspondence, the coding mode of the second and the third cameras are estimated (process action 1226). Since the estimation is not always correct, these found coding modes and even the motion vectors need to be refined, which is achieved by a second mode decision process (process action 1228) with less computing cost. Each MB is then coded based on the found coding mode (process action 1230). Similar to the mode decision for a single view, this second decision process also calculates the difference between the original MB and the motion compensated MB. However, only the difference of a small portion of the pixels is calculated. As a result, much of the complexity is reduced.

In the multi-view case, each view is decoded independently, the same as that of the single-view case. If MV is predicted from the neighboring view, the MV of the neighboring view should be decoded first.

3.2 Off-Line Compression

Figure 13:
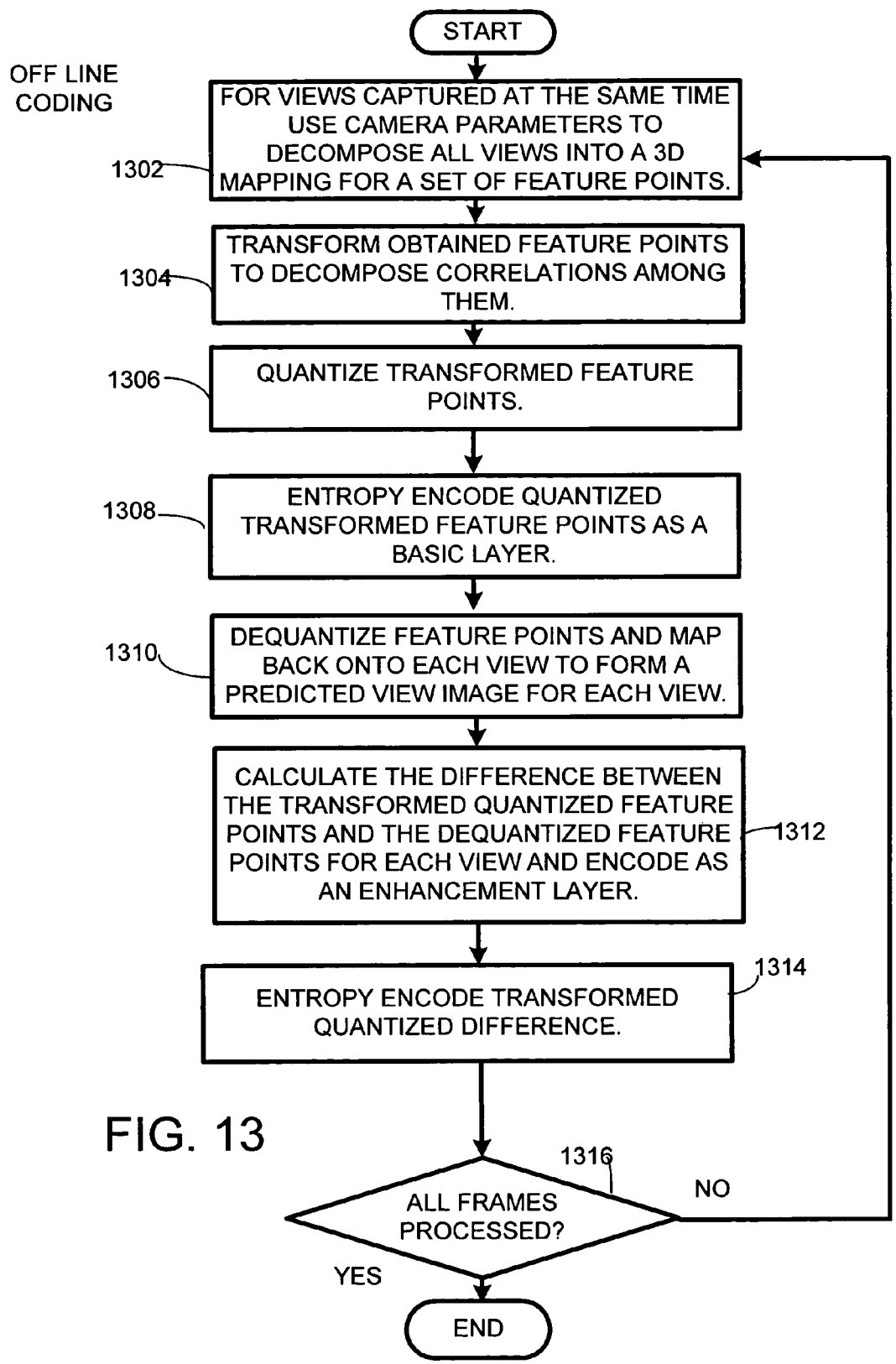
FIG. 13 is a flow diagram depicting the off-line compression scheme of one embodiment of the invention.
Figure 14:
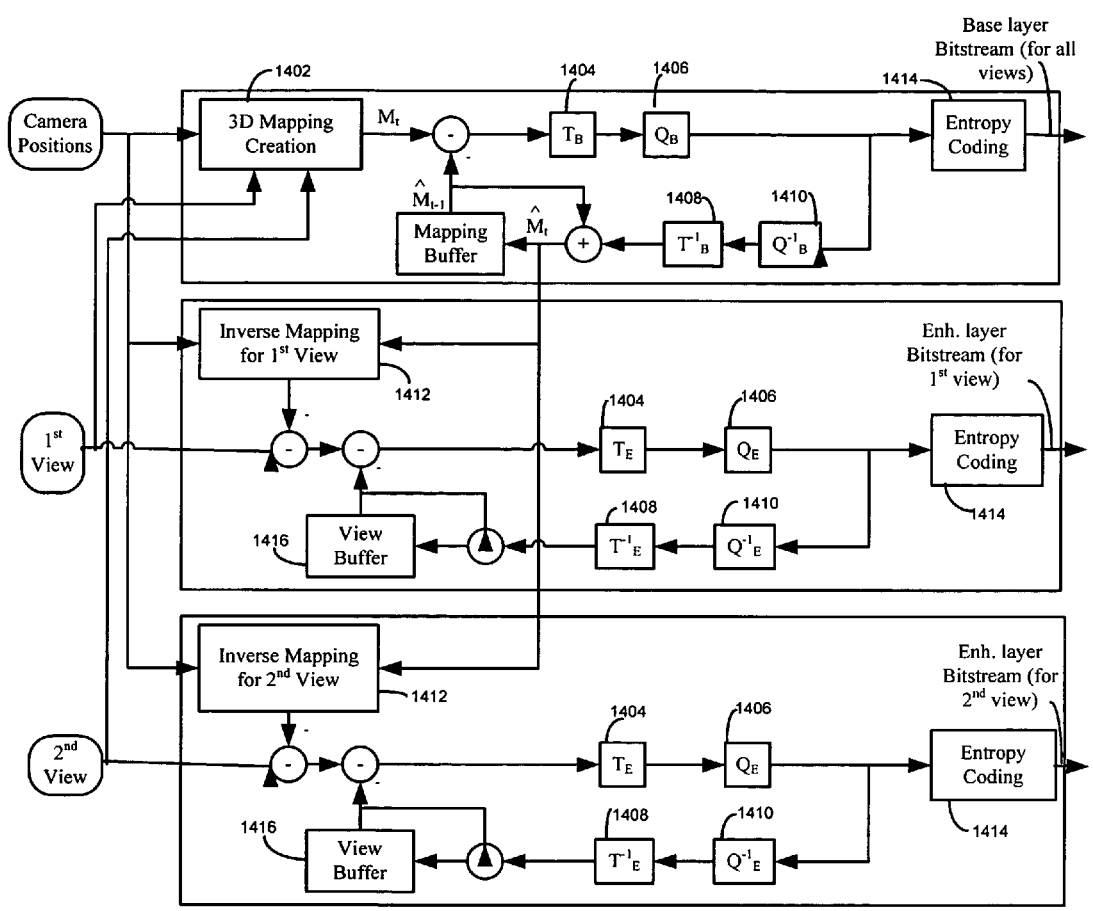
FIG. 14 is the architecture of the off-line compression system of one embodiment of the invention.

Off-line compression can be used to compress or further compress the video data streams. As shown in FIGS. 13 and 14, a key idea of off-line compression is to decompose all views into a 3D mapping, which consists of a group of feature points in the 3D environment. As shown in FIG. 13, process action 1302, each feature point is represented by its 3D coordinates (x, y, z) and the corresponding color components (Y, U, V). The created mapping is the minimum set of feature points that can reconstruct all of the pixels in each view. Different from the transform-based decomposition such as DCT and DWT, this kind of decomposition is the most efficient one for decorrelating a multi-view video. Clearly, when the number of views increases, only those new feature points (i.e., the new information) need to be recorded, whereas others can be found from the existing mapping.

After the 3D mapping creation, as shown in process action 1304, the obtained feature points are transformed to further decompose the correlations among them. The transformed results are quantized and encoded as a 'base layer' bit stream (process actions 1306, 1308). The dequantized feature points are mapped back onto each view to form a predicted view image (process action 1310). The predicted image is close to the original one; however, there are still some differences between them. The difference is encoded independently as an 'enhancement layer' of each view image as shown in process actions 1312, 1314 (the enhancement layer bit stream may be encoded in a scalable fashion to improve the network adaptation capability). Moreover, the temporal correlations are further employed when encoding the two kinds of layers. This is because, in the time domain, the static part of the mapping information and the enhancement residue are invariant. As for the moving part, it could still be compressed by the 3D motion structure.

An exemplary coding architecture for the off-line compression is depicted in FIG. 14. It includes a 3D mapping creation module 1402, transformation modules 1404, quantization modules 1406, inverse transformation modules 1408, inverse quantization modules 1410, inverse mapping modules 1412 and entropy encoding modules 1414, as well as view buffers 1416. To simplify the representations, only two views are considered in this example. For views captured at the $i^{th}$ time, all view images and the cameras' positions are put into a '3D mapping creation' module to extract the feature points set $M_i$. The mapping information $M_i$ is then predicted from the previous reconstructed feature point set $\hat{M}_{i-1}$ to remove its temporal correlations. The predicted residues $M_i - \hat{M}_{i-1}$ are transformed and quantized (either DCT or Discrete Wavelet Transform (DWT) or other transformation can be adopted here). Finally, entropy coding is applied to generate the base layer bit stream. The reconstructed mapping information $\hat{M}_i$ is then put into an 'Inverse Mapping' module, along with the cameras' positions. After that, a predicted image for each view is attained. The difference between the predicted image and the original one is further decorrelated by the temporal prediction. The residue is transformed and quantized (either DCT or DWT or other transformation can be adopted here). Finally, entropy coding is applied to generate the enhancement layer bit streams. (In this example, two enhancement layer bit streams are yielded, one bit stream for each view.)

The decoding process is as follows. Assume that one wants to reconstruct a certain view. The base layer is first decoded through entropy decoding, de-quantization, inverse transform, and so on (e.g., the inverse of the coding process of that layer). After that, the enhancement layer of that view is then decoded through entropy decoding, de-quantization, inverse transform, and so on. Finally, the obtained common feature points (from base layer) are inverse mapped to that view. The attained image plus the enhancement layer decoded results form the reconstructed image of that view.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES 1. http://www.ri.cmu.edu/projects/project449.html
2. Z. Zhang, "A flexible new technique for camera calibration", IEEE Transactions on Pattern Analysis and Machine Intelligence, 22(11):1330-1334, 2000.
3. S. Wurmlin, E. Lamboray, O. G. Staadt, and M. H. Gross, "3D Video Recoder", Proc. of Pacific Graphics '02, pp. 325-334, Oct. 9-11, 2002.
4. ISO/IEC JTC1/SC29NVG 11 N5877, "Applications and requirements for 3DAV", July 2003.
5. ISO/IEC JTC1/SC29/WG 11 N5878, "Report on 3DAV exploration", July 2003.

Wherefore, what is claimed is:

1. A computer-readable storage medium having stored thereon a data structure, comprising:
    a set of data fields containing data representing video streams that were captured simultaneously of the same event or event space from different viewpoints; and
    a set of data fields representing a video index for searching and locating the selected ones of the set of data fields representing the video streams that were taken simultaneously of the same event or event space; wherein the video index comprises:
    a first data field layer comprising a timestamp field, a field representing an offset of the video index data, a high address pointer field, a flag indicating whether there is a transition to a high address pointer or not, and a field representing the number of cameras at that time instant; and
        a second data field layer corresponding to the first data layer comprising a camera ID field, a field representing a coding type of that frame, and a low-address pointer field.

2. The computer-readable storage medium of claim 1 wherein the contents of the number of cameras field at different time stamps are different.

3. The computer-readable storage medium of claim 2 wherein the high address pointer field in the first data field layer and the low address pointer in the second data field layer together point to the starting point of a compressed video frame.

4. The computer-readable storage medium of claim 3 wherein the high address pointer is 32 bits and the low address pointer is 32 bits.

5. The computer-readable storage medium of claim 3 wherein if the flag is set a low address is checked and if the value of the low address is smaller than a previous low address, the high address pointer should be increased by one for subsequent high address pointers.

6. The computer-readable storage medium of claim 1 further comprising a set of data fields containing data representing audio streams corresponding to the video streams that were taken simultaneously of the same event or event space.

7. The computer-readable storage medium of claim 6 further comprising a set of data fields representing an audio index for searching and locating the set of data fields representing the audio streams corresponding to the video streams that were taken simultaneously of the same event or event space.

8. The computer-readable storage medium of claim 7 wherein the audio index comprises:
    a first data field layer comprising a timestamp field, a field representing an offset of the audio index data, and a field representing the number of audio records at a time instant; and
    a second data field layer corresponding to the first data field layer comprising an audio ID field and a pointer field representing the starting point of a compressed audio frame.

9. The computer-readable storage medium of claim 8 wherein the pointer field is 32 bits.

10. The computer-readable storage medium of claim 8 wherein the number of audio streams at different time stamps are different.

11. A computer-readable storage medium having stored thereon a data structure, comprising:
    a set of data fields containing data representing video streams and audio streams that were captured simultaneously of the same event from different viewpoints;
    a set of data fields representing a video index for searching and locating selected ones of the set of data fields representing the video streams that were taken simultaneously of the same event or event space; wherein the data fields representing the video index comprise:
    a first data field layer comprising a timestamp field, a field representing an offset of the video index data, a high address pointer field, a flag indicating whether there is a transition to a high address pointer or not, and a field representing the number of cameras at that time instant, and
    a second data field layer corresponding to the first data layer comprising a camera ID field, a field representing a coding type of that frame, and a low-address pointer field; and
    a set of data fields representing an audio index for searching and locating selected ones of the set of data fields representing the audio streams corresponding to the video streams that were taken simultaneously of the same event.

12. The computer-readable storage medium of claim 11 wherein the captured streams of video and audio are accessible in real-time.

13. The computer-readable storage medium of claim 12 wherein the captured streams of video and audio are stored for later viewing.

14. The computer-readable storage medium of claim 13 wherein the captured streams of video and audio are stored on a server.

15. The computer-readable storage medium of claim 13 wherein the captured streams of video and audio are stored on a client.

16. The computer-readable storage medium of claim 12 wherein a user can select a given video stream from the captured video stream to view the event from a selected camera viewpoint.

17. The computer-readable storage medium of claim 16 wherein when a user selects a given video stream from the captured video stream to view the event from a selected camera viewpoint, the corresponding audio stream from the captured audio streams will be audible.

18. The computer-readable storage medium of claim 12 wherein a user can select a given audio stream from the captured audio streams to listen to the event from a selected location.

* * * * *